Figure 1:
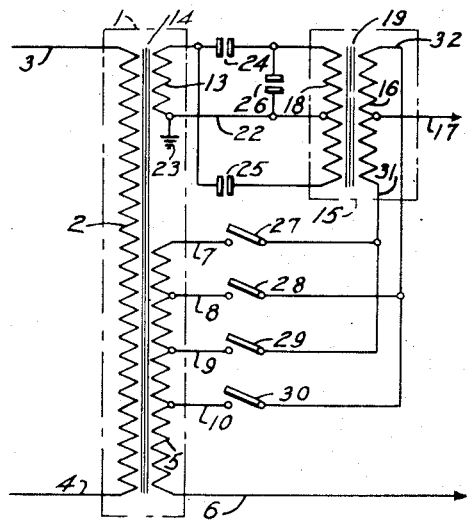

Feb. 11, 1941.  F. JANSA  2,231,721
ELECTRICAL INDUCTION APPARATUS
Filed June 28, 1940  2 Sheets-Sheet 1

WITNESSES:

INVENTOR
Frantisek Jansa.
BY
Franklin E. Hardy
ATTORNEY

Feb. 11, 1941. F. JANSA 2,231,721
ELECTRICAL INDUCTION APPARATUS
Filed June 28, 1940 2 Sheets-Sheet 2
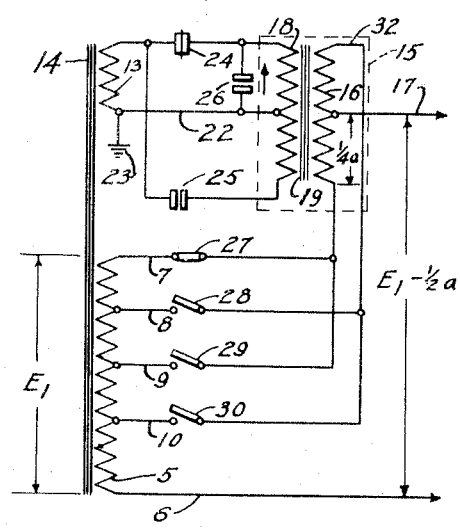
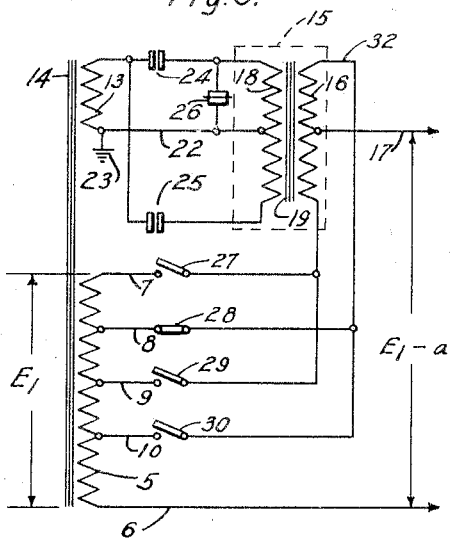
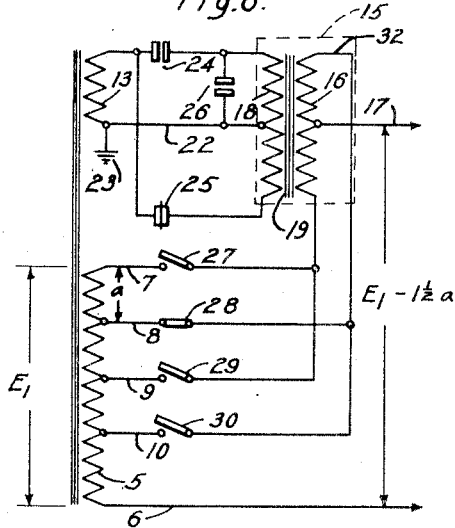
WITNESSES:
INVENTOR
Frantisek Jansa.
BY
ATTORNEY Patented Feb. 11, 1941

2,231,721

UNITED STATES PATENT OFFICE 2,231,721

ELECTRICAL INDUCTION APPARATUS

Frantisek Jansa, Prague, Bohemia, assignor to Westinghouse Electric & Manufacturing Company, East Pittsburgh, Pa., a corporation of Pennsylvania Application June 28, 1940, Serial No. 342,944
In Czechoslovakia April 4, 1939

8 Claims. (Cl. 171—119)

This invention relates to electrical induction apparatus and particularly to transformers having tap changing equipment for varying the voltage ratio between the primary and secondary circuits to which the transformer is connected. In equipments of this character it is customary to provide either resistors or reactors variously connected in such manner that, during the switching operation to effect tap changes, the current between the regulated winding of the main transformer and the line circuit conductor to which it is connected is not interrupted. In these two types of equipments the use of a preventive autotransformer as the reactor element has the advantage over the use of resistors that it has ($2n-1$) voltage steps where $n$ is the number of tap connections on the regulated transformer winding, whereas in tap changing equipment employing resistors the number of voltage steps is equal to the number of tap connections $n$.

The disadvantage of tap changing transformer equipments employing an autotransformer for bridging adjacent transformer taps is that the switches required to change the tap connections between the line circuit conductor and the transformer winding must be insulated to withstand the high voltage of the transformer winding. In such cases where the circuit controlling switches operate to connect the line circuit conductor to the high voltage end of the transformer winding, it is necessary that they be fully insulated for operation at the high voltage, and must usually be placed in a separate compartment and equipped with bushings leading to the autotransformers which are located in the main transformer tank. If series transformers are used for boosting or bucking the output voltage of the main transformer, the installation becomes costly and the mechanism becomes complicated, since it is necessary to provide for maintaining the series transformers continuously in the circuit.

In accordance with the present invention an auxiliary switching transformer is connected to the main tap changing transformer in such manner that it is possible to regulate the voltage output of the main transformer over a wide voltage range without interrupting the circuit between the transformer and the power circuit conductor. The auxiliary transformer has a small capacity output serving the purpose of developing a voltage that is equal to the voltage existing between adjacent taps on the regulating winding of the main transformer. The auxiliary transformer is connected between the main transformer and the power circuit conductor as an autotransformer adapted to bridge adjacent taps on the main transformer winding.

The invention provides means for connecting the auxiliary transformer to the main transformer in a manner to avoid the limitation of earlier auxiliary transformers using the bridge type autotransformer connection that they required fully insulated circuit controlling switches. This limitation is overcome by providing a special winding on the main transformer to which the primary winding of the auxiliary transformer is connected, the primary winding of the auxiliary transformer and the several circuit breakers associated therewith being grounded to ensure their operation at low voltages.

It is an object of the invention to provide equipment for regulating the voltage output of a tap changing transformer over a wide range of voltage steps without interrupting the flow of current between the transformer and the power circuit conductor supplied therefrom.

It is a further object of the invention to provide equipment of the character indicated employing a switching transformer of small capacity output for developing a voltage across its secondary winding that is equal to the voltage existing between the successive tap connections on the regulated winding of the transformer, the primary winding being excited from a special winding of the main transformer and controlled in such manner that the current flowing through the regulated transformer winding is varied to alternately correspond to the voltage of the several taps and to alternately be increased or decreased with respect thereto.

Other objects and advantages of the invention will be apparent from the following description of a preferred embodiment of the invention, reference being made to the accompanying drawings in which:

Figure 1 is a diagrammatic view of apparatus and circuits illustrating the invention, and Figs. 2 to 6 are views illustrating several steps in the operation of the equipment.

Referring to Fig. 1 of the drawings, a main transformer is illustrated including the parts shown within the dotted rectangle 1 and including a primary winding 2 supplied with current from conductors 3 and 4 and a secondary winding 5 having a terminal conductor 6 at one end that may be connected to a power circuit conductor or to ground and a plurality of tap conductors 7, 8, 9 and 10 connected to equally spaced tap points along the winding 5 to provide equal voltage steps. An auxiliary winding 13 is likewise provided, the three windings 2, 5 and 13 being inductively related to the same core 14. An auxiliary switching transformer is provided including the parts shown within the dotted rectangle 15 and comprising a secondary winding 16, the mid-point of which is connected to a power circuit conductor 17 and a primary winding 18 inductively connected to the winding 16 through a core structure 19. The mid-point of the winding 18 is connected by conductor 22 to one end of the auxiliary winding 13 and to ground at 23. Circuit breaker switches 24, 25 and 26 are provided for connecting the auxiliary winding 13 across the upper half of the winding 18, or across the lower half of the winding 18, or to short circuit the upper half of the winding 18. The circuits controlled by the switches 24 and 25 are so arranged that the winding 18 is energized in opposite directions with respect to the direction of instantaneous current flow through the main transformer windings. The apparatus is so designed that when either the switch 24 or 25 is closed the voltage developed across the secondary winding 16, due to the energization of the winding 18 from the auxiliary winding 13, corresponds to the voltage between adjacent tap conductors of the series 7 to 10 on the winding 5, and, when the switch 26 is closed to short-circuit the winding 18 while the switches 24 and 25 are both in their open position, the reactance of the transformer winding 16 is decreased to a very small or negligible value. It will be evident from the construction shown that the windings 13 and 18 and the circuit closing switches 24, 25 and 26 are required to be insulated for low voltage only, since they are not directly connected in the high voltage circuit of the main transformer.

Figure 2:
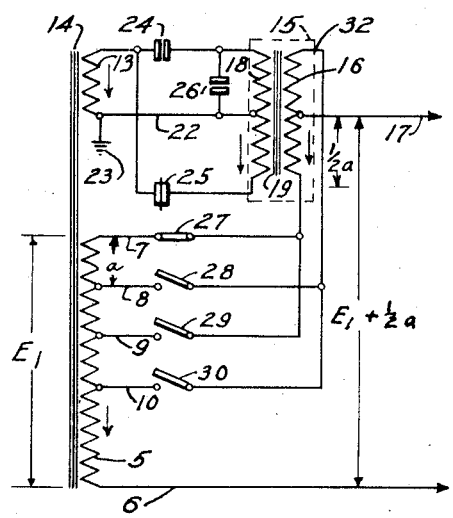

Referring to Fig. 2, it will be noted that switches 25 and 27 are in their circuit closing positions which corresponds to a maximum output voltage between the conductors 6 and 17 which may be represented as $E_1 + \frac{1}{2}a$ where the voltage $E_1$ is the voltage across the total winding 5 and the voltage $a$ is the voltage between adjacent ones of tap conductors 7, 8, 9 and 10. The apparatus is so designed that when the switch 25 is closed the voltage developed in the winding 18 has a phase relation to the voltage in the winding 5 such that when the lower half of the winding 18 is connected in series with the winding 5 the two voltages add so that the voltage of the conductor 17 is increased above that of the lower terminal of the winding 18 by the amount $\frac{1}{2}a$.

Figure 3:
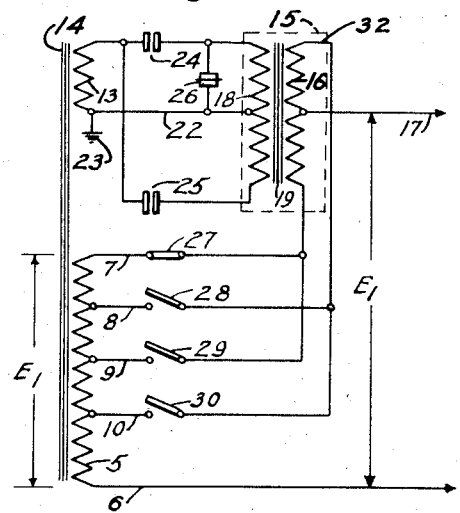

If it is desired to reduce the voltage of the output circuit between conductors 17 and 6, the next lower voltage step is effected by operating the switch 25 to its open position and the switch 26 to its closed position as shown in Fig. 3, thus short-circuiting the half of the winding 18 which has the effect of reducing the reactance of the winding 16 in series with the winding 5 substantially to zero so that the voltage between conductors 17 and 16 becomes $E_1$.

The next step in the cycle of operation is effected by opening the switch 26 and closing the switch 24 as shown in Fig. 4. This energizes the switching transformer 15 from the auxiliary winding 13 to develop a voltage across the winding 16 having a phase relation opposite to that effected with the circuit connections shown in Fig. 2, so that the voltage between the conductors 17 and 6 is less than the voltage across the winding 5 by the amount $\frac{1}{2}a$. With this circuit connection between the switching transformer and the auxiliary winding 13, the voltage of the upper terminal 32 of the winding 16 corresponds to the voltage of the tap conductors 8 so that the tap selecting switch 28 may be closed connecting the winding 16 in parallel with that portion of the winding 5 between the tap conductors 7 and 8. The selector switch 27 may now be opened. This operation of the switches 27 and 28 does not change the voltage between conductors 6 and 17, since the voltage of the conductor 17 is the same when a voltage having the value of $\frac{1}{2}a$ is added to the voltage of the tap 8 as when a voltage having the value $\frac{1}{2}a$ is subtracted from the voltage of the tap 7.

The next step in voltage change is effected by opening the switch 26 and closing the switch 25 as shown in Fig. 5. Since with the switch 26, when closed, short circuits the upper half of the winding 18 and reduces the reactance of the transformer winding 16 to a negligible value, the voltage of the conductor 17 becomes that of the tap conductor 8 so that the voltage impressed between conductors 17 and 6 becomes $E_1 - a$.

The next voltage step is effected by opening the switch 26 and closing the switch 25 as shown in Fig. 6 which reduces the voltage between conductors 17 and 6 to a value $E_1 - 1\frac{1}{2}a$ in the same manner as explained above with respect to the circuits shown in Fig. 2. It will be noted that the positions of the switches 24, 25 and 26, shown in Fig. 5, correspond to those shown in Fig. 3 in which positions the output voltage corresponds to the voltage of a particular tap on the winding 5 depending on which one of the selecting switches 27, 28, 29 and 30 are closed. For successive steps in reducing the voltage, a corresponding sequence of operation to that described above is effected for alternately adding and subtracting the voltage component between the selected tap connection on the winding 5 and the conductor 17. The cycle above described will be performed in the opposite direction to obtain successively increasing steps of voltage between conductors 6 and 17.

Modifications in the circuits and apparatus illustrated and described without departing from my invention will occur to those skilled in the art, and I do not wish to be limited otherwise than by the scope of the appended claims.

I claim as my invention:

1. Electrical induction apparatus for regulating the voltage of an electric circuit comprising a main transformer having a regulated winding provided with a plurality of equally spaced tap conductors, means for connecting said winding to a line circuit conductor comprising a switching transformer having a secondary winding to the mid-point of which the line circuit conductor is connected, and a primary winding, said switching transformer being designed to develop a secondary winding voltage corresponding to the voltage between adjacent tap conductors of the regulated winding, a plurality of tap selecting switches for connecting the terminals of the secondary winding of the switching transformer to selected tap conductors of the regulated winding, an auxiliary winding on the main transformer core, and means for connecting the auxiliary winding in series with half the primary winding of the switching transformer.

2. Electrical induction apparatus for regulating the voltage of an electric circuit comprising a main transformer having a regulated winding provided with a plurality of equally spaced tap conductors, means for connecting said winding to a line circuit conductor comprising a switching transformer having a secondary winding to the mid-point of which the line circuit conductor is connected, and a primary winding, said switching transformer being designed to develop a secondary winding voltage corresponding to the voltage between adjacent tap conductors of the regulated winding, a plurality of tap selecting switches for connecting the terminals of the secondary winding of the switching transformer to selected tap conductors of the regulated winding, an auxiliary winding on the main transformer core, and means for connecting the auxiliary winding in series with half the primary winding of the switching transformer in either of two phase relations to raise or lower the voltage of the line circuit conductor with respect to a tap connection to which it is connected by an amount substantially equal to half the voltage between adjacent tap connections of the regulated winding.

3. Electrical induction apparatus for regulating the voltage of an electric circuit comprising a main transformer having a regulated winding provided with a plurality of equally spaced tap conductors, means for connecting said winding to a line circuit conductor comprising a switching transformer having a secondary winding to the mid-point of which the line circuit conductor is connected, and a primary winding, said switching transformer being designed to develop a secondary winding voltage corresponding to the voltage between adjacent tap conductors of the regulated winding, a plurality of tap selecting switches for connecting the terminals of the secondary winding of the switching transformer to selected tap conductors of the regulated winding, an auxiliary winding on the main transformer core, and means for connecting the auxiliary winding in series with half the primary winding of the switching transformer, said auxiliary winding and switching transformer being so designed that the secondary winding of the switching transformer develops a voltage when energized from the auxiliary winding corresponding to the voltage between adjacent tap conductors on the regulated winding.

4. Electrical induction apparatus for regulating the voltage of an electric circuit comprising a main transformer having a regulated winding provided with a plurality of equally spaced tap conductors, means for connecting said winding to a line circuit conductor comprising a switching transformer having a secondary winding to the mid-point of which the line circuit conductor is connected, and a primary winding, said switching transformer being designed to develop a secondary winding voltage corresponding to the voltage between adjacent tap conductors of the regulated winding, a plurality of tap selecting switches for connecting the terminals of the secondary winding of the switching transformer to selected tap conductors of the regulated winding, an auxiliary winding on the main transformer core, means for connecting the auxiliary winding in series with half the primary winding of the switching transformer in either of two phase relations to raise or lower the voltage of the line circuit conductor with respect to a tap connection to which it is connected by an amount substantially equal to half the voltage between adjacent tap connections of the regulated winding, and means for decreasing the voltage drop across the switching transformer to substantially zero when disconnected from the auxiliary winding.

5. Electrical induction apparatus for regulating the voltage of an electric circuit comprising a main transformer having a regulated winding provided with a plurality of equally spaced tap conductors, means for connecting said winding to a line circuit conductor comprising a switching transformer having a secondary winding to the mid-point of which the line circuit conductor is connected, and a primary winding, said switching transformer being designed to develop a secondary winding voltage corresponding to the voltage between adjacent tap conductors of the regulated winding, a plurality of tap selecting switches for connecting the terminals of the secondary winding of the switching transformer to selected tap conductors of the regulated winding, an auxiliary winding on the main transformer core, means for connecting the auxiliary winding in series with half the primary winding of the switching transformer, and means for connecting the auxiliary winding and the switching transformer primary winding to ground to limit the voltage thereof with respect to the voltage of any tap connecting terminal.

6. Electrical induction apparatus for regulating the voltage of an electric circuit comprising a main transformer having a regulated winding provided with a plurality of equally spaced tap conductors, means for connecting said winding to a line circuit conductor comprising a switching transformer having a secondary winding to the mid-point of which the line circuit conductor is connected, and a primary winding, said switching transformer being designed to develop a secondary winding voltage corresponding to the voltage between adjacent tap conductors of the regulated winding, a plurality of tap selecting switches for connecting the terminals of the secondary winding of the switching transformer to selected tap conductors of the regulated winding, an auxiliary winding on the main transformer core, and means for connecting the auxiliary winding in series with half the primary winding of the switching transformer in either of two phase relations to raise or lower the voltage of the line circuit conductor with respect to a tap connection to which it is connected by an amount substantially equal to half the voltage between adjacent tap connections of the regulated winding, said auxiliary winding and switching transformer being so designed that the secondary winding of the switching transformer develops a voltage when energized from the auxiliary winding corresponding to the voltage between adjacent tap conductors on the regulated winding.

7. Electrical induction apparatus for regulating the voltage of an electric circuit comprising a main transformer having a regulated winding provided with a plurality of equally spaced tap conductors, means for connecting said winding to a line circuit conductor comprising a switching transformer having a secondary winding to the mid-point of which the line circuit conductor is connected, and a primary winding, said switching transformer being designed to develop a secondary winding voltage corresponding to the voltage between adjacent tap conductors of the regulated winding, a plurality of tap selecting switches for connecting the terminals of the secondary winding of the switching transformer to selected tap conductors of the regulated winding, an auxiliary winding on the main transformer core, means for connecting the auxiliary winding in series with half the primary winding of the switching transformer, said auxiliary winding and switching transformer being so designed that the secondary winding of the switching transformer develops a voltage when energized from the auxiliary winding corresponding to the voltage between adjacent tap conductors on the regulated winding, and means for decreasing the voltage drop across the switching transformer to substantially zero when disconnected from the auxiliary winding.

8. Electrical induction apparatus for regulating the voltage of an electric circuit comprising a main transformer having a regulated winding provided with a plurality of equally spaced tap conductors, means for connecting said winding to a line circuit conductor comprising a switching transformer having a secondary winding to the mid-point of which the line circuit conductor is connected, and a primary winding, said switching transformer being designed to develop a secondary winding voltage corresponding to the voltage between adjacent tap conductors of the regulated winding, a plurality of tap selecting switches for connecting the terminals of the secondary winding of the switching transformer to selected tap connections of the regulated winding, an auxiliary winding on the main transformer core, means for connecting the auxiliary winding in series with half the primary winding of the switching transformer in either of two phase relations to raise or lower the voltage of the line circuit conductor with respect to a tap connection to which it is connected by an amount substantially equal to half the voltage between adjacent tap connections of the regulated winding, and means for connecting the auxiliary winding and the switching transformer primary winding to ground to limit the voltage thereof with respect to the voltage of any tap connecting terminal.

FRANTISEK JANSA.